US010984616B2

(12) United States Patent
Arakawa et al.

(10) Patent No.: US 10,984,616 B2
(45) Date of Patent: Apr. 20, 2021

(54) CAR SHARING SYSTEM AND CAR SHARING PROGRAM (71) Applicant: KABUSHIKI KAISHA TOKAI RIKA DENKI SEISAKUSHO, Aichi (JP)

(72) Inventors: Masahiro Arakawa, Aichi (JP); Masahiko Oya, Aichi (JP); Masaki Oshima, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/625,929

(22) PCT Filed: Jun. 27, 2018

(86) PCT No.: PCT/JP2018/024450
§ 371 (c)(1),
(2) Date: Dec. 23, 2019

(87) PCT Pub. No.: WO2019/004310
PCT Pub. Date: Jan. 3, 2019

(65) Prior Publication Data
US 2020/0156591 A1 May 21, 2020

(30) Foreign Application Priority Data
Jun. 29, 2017 (JP) .............................. JP2017-127586

(51) Int. Cl.
*G07C 9/00* (2020.01)
*G07C 9/22* (2020.01)
(Continued)

(52) U.S. Cl.
CPC ........ *G07C 9/00309* (2013.01); *B60R 25/209* (2013.01); *B60R 25/241* (2013.01);
(Continued)

(58) Field of Classification Search
CPC .................................. B60R 25/24; G07C 9/22
See application file for complete search history.

(56) References Cited

U.S. PATENT DOCUMENTS

2016/0055699 A1* 2/2016 Vincenti ............... H04W 12/04
340/5.61
2017/0278329 A1 9/2017 Konishi

FOREIGN PATENT DOCUMENTS

| JP | 2012-215047 | 11/2012 |
|----|-------------|---------|
| JP | 2016-071834 | 5/2016  |
| JP | 2016-115077 | 6/2016  |

OTHER PUBLICATIONS

International Search Report issued in International Patent Application No. PCT/JP2018/024450, dated Sep. 25, 2018 with an English translation thereof.

* cited by examiner

*Primary Examiner* — Daniell L Negron
(74) *Attorney, Agent, or Firm* — Greenblum & Bernstein, P.L.C.

(57) ABSTRACT

A car sharing system includes a car share device mounted on a vehicle. The car share device performs wireless communication with a mobile terminal, to which code information is registered so that the mobile terminal is actuated as a vehicle key of the vehicle, to authenticate the code information through the wireless communication. In an authentication completion state of the code information, the car share device performs ID verification through an electronic key system of the vehicle to allow the mobile terminal to operate an on-board device. The car sharing system further includes a position monitor that monitors whether the mobile terminal has approached the vehicle, and an automatic transmitter that automatically transmits an actuation permission request, which requests a permission for actua-
(Continued)

tion of the on-board device, from the mobile terminal when the position monitor determines that the mobile terminal has approached the vehicle.

6 Claims, 5 Drawing Sheets

(51) Int. Cl.
*B60R 25/20* (2013.01)
*B60R 25/24* (2013.01)
*G07C 9/28* (2020.01)

(52) U.S. Cl.
CPC .............. *B60R 25/245* (2013.01); *G07C 9/22* (2020.01); *G07C 9/28* (2020.01); *B60R 2325/205* (2013.01); *G07C 2009/00539* (2013.01); *G07C 2009/00547* (2013.01); *G07C 2009/00769* (2013.01)

CAR SHARING SYSTEM AND CAR SHARING PROGRAM

TECHNICAL FIELD

The present invention relates to a car sharing system in which a vehicle is shared by a number of people and a car sharing program.

BACKGROUND ART

A car sharing system in which a vehicle is shared by a number of people is known in the art (refer to Patent Documents 1 and 2). In this type of car sharing system, for example, the use of car sharing is registered to a server or the like in advance. When a reservation of a vehicle is made with, for example, a mobile terminal (e.g., high-performance mobile phone), the vehicle is permitted to be used in the reserved time.

Patent Document 1: Japanese Laid-Open Patent Publication No. 2016-115077
Patent Document 2: Japanese Laid-Open Patent Publication No. 2016-71834

SUMMARY OF THE INVENTION

When using the shared vehicle, the user unlocks doors of the vehicle with the mobile terminal. The vehicle notifies the user that the doors of the vehicle have been unlocked through answer back. At this time, since the answer back specifies the vehicle that may be used, an ill-intentioned third person may enter the vehicle and steal the vehicle. Measures need to be taken against this problem. Also, the users desire improvement in convenience as well as improvement in the security when entering vehicles.

It is an object of the present invention to provide a car sharing system and a car sharing program that improve the security of a shared vehicle when used and improve convenience for a user.

An aspect of a car sharing system includes a car share device mounted on a vehicle. The car share device performs wireless communication with a mobile terminal, to which code information is registered so that the mobile terminal is actuated as a vehicle key of the vehicle, to authenticate the code information through the wireless communication. In an authentication completion state of the code information, the car share device performs ID verification through an electronic key system of the vehicle to allow the mobile terminal to operate an on-board device. The car sharing system further includes a position monitor that monitors whether the mobile terminal has approached the vehicle and an automatic transmitter that automatically transmits an actuation permission request, which requests a permission for actuation of the on-board device, from the mobile terminal when the position monitor determines that the mobile terminal has approached the vehicle.

With this configuration, when operating the on-board device of the vehicle with the mobile terminal in the car sharing system, unless the mobile terminal has approached the vehicle and the actuation permission request is transmitted from the mobile terminal to the vehicle, the on-board device cannot be actuated. Thus, the condition for operating the on-board device with the mobile terminal is that the user carrying the mobile terminal is close to the vehicle. This improves the security of the shared vehicle when used. In addition, the actuation permission request is automatically transmitted from the mobile terminal to the vehicle. The user does not have to perform an additional operation for transmitting the actuation permission request. This improves the convenience for the user.

Preferably, in the car sharing system, the car share device is not connected to the electronic key system by wire and is connected to the electronic key system through wireless communication. This configuration allows the car share device to be readily retro-fitted to the vehicle.

Preferably, in the car sharing system, after the mobile terminal transmits an unlocking request of a vehicle door of the vehicle, when the position monitor determines that the mobile terminal has approached the vehicle, the automatic transmitter automatically transmits the actuation permission request from the mobile terminal. With this configuration, after the vehicle door is switched to the unlocked state, the series of processes that monitor whether the mobile terminal has approached the vehicle and automatically transmit the actuation permission request is executed. Hence, the actuation permission request is automatically transmitted when the user intends to enter the vehicle. The automatic transmission of the actuation permission request is accurately aligned with the intention of the user.

Preferably, in the car sharing system, the mobile terminal includes the position monitor and the automatic transmitter. With this configuration, the monitoring of the vehicle closeness and the automatic transmission of the actuation permission request are performed at the mobile terminal. Thus, the car share device does not have to have these kinds of functions.

Preferably, in the car sharing system, the car share device includes a key function portion that implements a smart function for performing the ID verification through bidirectional short-range wireless communication with the electronic key system. In this case, preferably, when an unlocking request of a vehicle door of the vehicle is received from the mobile terminal, the car share device enters an actuation permission request waiting state, in which the car share device waits for reception of the actuation permission request, and when the actuation permission request is received from the mobile terminal in the actuation permission request waiting state, the car share device switches the smart function of the key function portion from a deactivation state to an activation state. With this configuration, when operating the on-board device of the vehicle with the mobile terminal in the car sharing system, unless the actuation permission request is transmitted from the mobile terminal to the car share device and the smart function of the key function portion is validated, the ID verification through smart communication cannot be executed and the on-board device cannot be actuated. Thus, when operating the on-board device with the mobile terminal, the condition for validating the smart function needs to be satisfied. This is further advantageous to improvement of the security of the shared vehicle when used, as compared to when the smart function is validated with no condition.

Preferably, in the car sharing system, the actuation permission request is an engine start permission request that requests to start an engine of the vehicle. With this configuration, when starting the engine of the vehicle, the engine start permission request needs to be transmitted from the mobile terminal to the vehicle. This reduces situations in which the engine is fraudulently started.

Another aspect is a car sharing program used in a car sharing system and including instructions executed by one or more processors. The instructions, when executed by the one or more processors, cause the one or more processors to perform operations including monitoring whether the mobile terminal has approached the vehicle and automatically transmitting an actuation permission request, which requests a permission for actuation of the on-board device, from the mobile terminal when it is determined that the mobile terminal has approached the vehicle.

The present invention improves both the security of a shared vehicle when used and convenience for a user.

DESCRIPTION OF THE EMBODIMENTS

An embodiment of a car sharing system and a car sharing program will now be described with reference to FIGS. 1 to 5.

Figure 1:
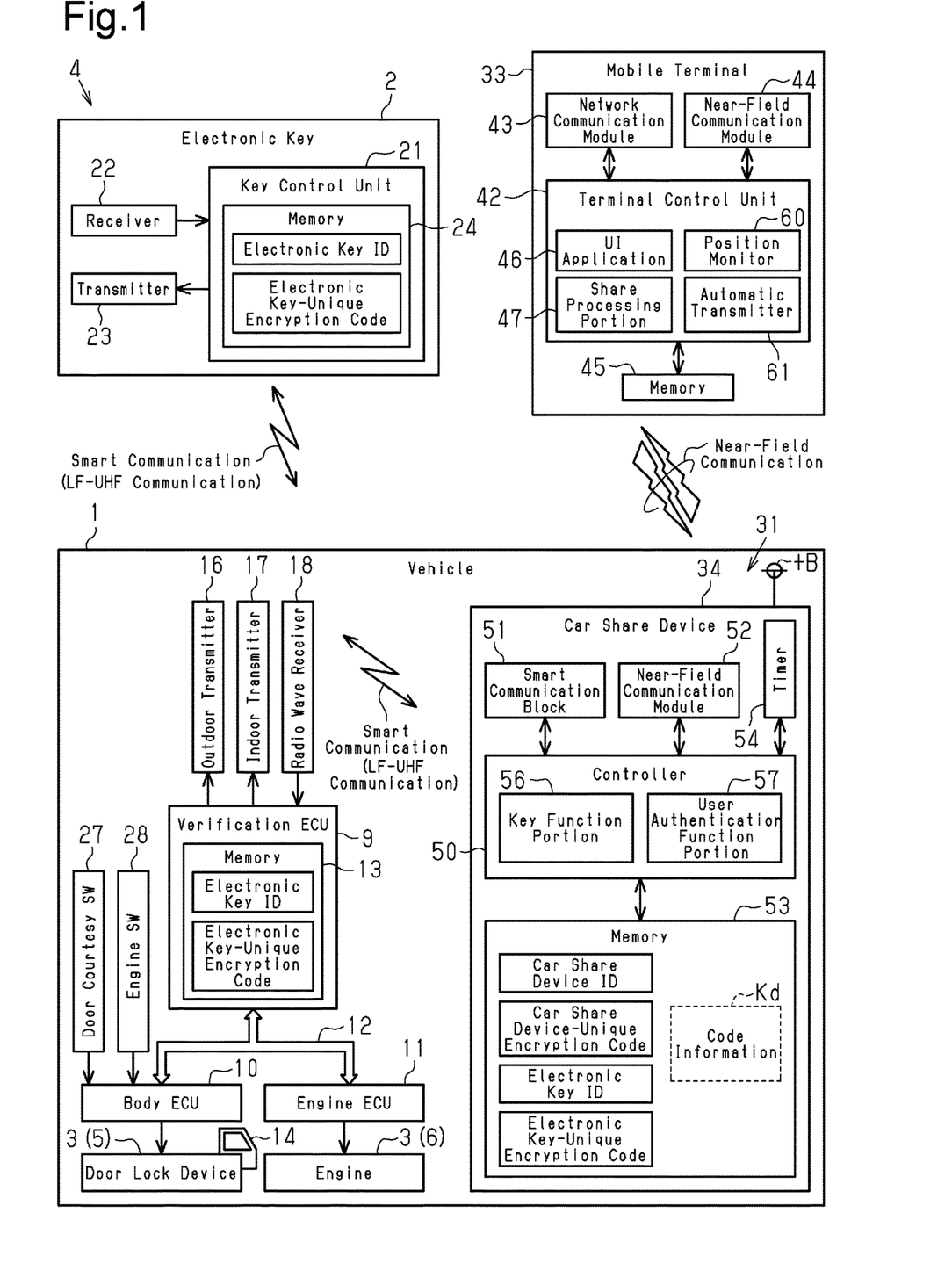
FIG. 1 is a diagram showing configurations of an embodiment of a car sharing system.

As shown in FIG. 1, a vehicle 1 (shared vehicle) includes an electronic key system 4 that performs ID verification with an electronic key 2 through wireless communication to execute or permit actuation of on-board devices 3. The electronic key system 4 is a key-operation-free system that performs ID verification through short-range wireless communication initiated by communication from the vehicle 1. In the key-operation-free system, ID verification (smart verification) is automatically performed without a direct operation of the electronic key 2. The on-board devices 3 include, for example, a door lock device 5 and an engine 6.

The vehicle 1 includes a verification electronic control unit (ECU) 9 as a verification device that performs ID verification. The vehicle 1 further includes a body ECU 10 that controls the power supply of on-board electric components and an engine ECU 11 that controls the engine 6. The ECUs 9 to 11 are electrically connected by an in-vehicle communication line 12. The communication line 12 is, for example, a controller area network (CAN) or a local interconnect network (LIN). The verification ECU 9 includes a memory 13 to which an electronic key ID unique to the electronic key 2 of the vehicle 1 is registered. The body ECU 10 controls the door lock device 5 that locks and unlocks a vehicle door 14.

The vehicle 1 includes an outdoor transmitter 16 configured to transmit a radio wave to the outside of the vehicle 1, an indoor transmitter 17 configured to transmit a radio wave inside the vehicle 1, and a radio wave receiver 18 configured to receive a radio wave in the vehicle 1. The outdoor transmitter 16 and the indoor transmitter 17 transmit radio waves of a low frequency (LF) band. The radio wave receiver 18 receives radio waves of an ultra-high frequency (UHF) band. The electronic key system 4 uses LF-UHF bidirectional communication.

The electronic key 2 includes a key control unit 21 that controls actuation of the electronic key 2, a receiver 22 that receives a radio wave in the electronic key 2, and a transmitter 23 that transmits a radio wave from the electronic key 2. The receiver 22 is configured to receive an LF radio wave. The transmitter 23 is configured to transmit a UHF radio wave. The key control unit 21 includes a memory 24 to which the electronic key ID of the electronic key 2 is registered.

When the vehicle is parked and a wake signal for activating the electronic key 2 is being transmitted from the outdoor transmitter 16 on an LF radio wave, if the electronic key 2 enters a communication area of the wake signal and receives the wake signal, the electronic key 2 is activated from a standby state. At this time, the verification ECU 9 starts ID verification, which is referred to as smart verification (in this case, outdoor smart verification), through communication (short-range wireless communication) with the activated electronic key 2. The smart verification includes, for example, electronic key ID verification that determines whether an electronic key ID is correct and challenge-response authentication that uses an encryption code unique to the electronic key 2 (electronic key-unique encryption code). When the electronic key ID verification or the challenge-response authentication are accomplished, the verification ECU 9 determines that the smart verification is accomplished and executes or permits the locking or unlocking of the vehicle door 14 with the body ECU 10.

For example, when entrance of the user is detected by a door courtesy switch 27, the verification ECU 9 transmits a wake signal from the indoor transmitter 17 instead of the outdoor transmitter 16. When the electronic key 2 receives the wake signal, the verification ECU 9 starts the ID verification (in this case, indoor smart verification) in the same manner as the outdoor smart verification. When the verification ECU 9 determines that the indoor smart verification is accomplished, the verification ECU 9 allows a power supply state transition operation (e.g., starting of engine) to be executed using an engine switch 28 installed in the vicinity of the driver seat.

The vehicle 1 includes a car sharing system 31 in which the single vehicle 1 is shared by a number of people. The car sharing system 31 of the present example includes a car share device 34 mounted on the vehicle 1. The car share device 34 has an encryption code (car share device-unique encryption code) that decodes code information Kd registered to the mobile terminal 33. The mobile terminal 33 obtains encrypted code information Kd from the server (not shown) and registers the code information Kd to the mobile terminal 33 so that the mobile terminal 33 is actuated as a vehicle key (electronic key) of the vehicle 1. The car share device 34 receives the code information Kd from the mobile terminal 33 through wireless communication and authenticates the code information Kd. When the authentication of the code information Kd is accomplished, the car share device 34 permits the mobile terminal 33 to operate the on-board devices 3.

The car share device 34 is independent from hardware configurations of the electronic key system 4 in the vehicle 1 and is retro-fitted to the vehicle 1. The car share device 34 corresponds to, for example, an electronic key that is validated only during the reserved time and serves as a spare key. The car share device 34 is configured to switch the electronic key function of the car share device 34 between validation and invalidation. The verification ECU 9 of the electronic key system 4 recognizes that the electronic key appears in the vehicle 1 or disappears in accordance with the switching of the electronic key function of the car share device 34 between validation and invalidation. The car share device 34 is supplied with power from a battery +B of the vehicle 1.

The mobile terminal 33 includes a terminal control unit 42 that controls actuation of the mobile terminal 33, a network communication module 43 that allows for network communication of the mobile terminal 33, a near-field communication module 44 that allows for near-field communication of the mobile terminal 33, and a memory 45 to which data is rewritable. A user authentication code, which is used when an encryption communication mode of near-field communication is performed with the car share device 34, is registered to the memory 45 of the mobile terminal 33. A preferred example of the near-field communication is Bluetooth (registered trademark). The user authentication code may be formed by, for example, a random number, the value of which changes whenever generated, and be registered to the car sharing system 31 in advance. Alternatively, when the vehicle 1 is used, the user authentication code may be generated and registered to a given member.

The mobile terminal 33 includes a user interface application 46 that controls actuation of the car sharing system 31 in the mobile terminal 33 and a share processing portion 47 that executes a sharing process of the vehicle 1 in the mobile terminal 33. The share processing portion 47 is, for example, functionally implemented by the terminal control unit 42 executing the user interface application 46.

The car share device 34 includes a controller 50 that controls actuation of the car share device 34, a smart communication block 51 that allows for smart communication of the car share device 34, a near-field communication module 52 that allows for near-field communication of the car share device 34, a memory 53 to which data is rewritable, and a timer 54 that controls the date and time in the car share device 34. A car share device ID and the car share device-unique encryption code are registered to the memory 53 in advance. The timer 54 is configured by, for example, a soft timer.

The code information Kd is registered to the memory 53 of the car share device 34. The code information Kd is generated, for example, in the server (not shown) and is registered to the car share device 34 via the mobile terminal 33. Only temporary use of the code information Kd is allowed. The code information Kd may be, for example, a one-time key that is allowed to be used only one time. When the code information Kd is a one-time key, the code information Kd is limited to only a single use. This improves the security of the vehicle 1 when used.

The car share device 34 includes a key function portion 56 and a user authentication function portion 57. In a non-restrictive example, the key function portion 56 and the user authentication function portion 57 are implemented as functions of the controller 50 by one or more processors (not shown) that execute one or more programs (instructions) stored in a storage region such as the memory 53. The key function portion 56 communicates with the verification ECU 9 through the smart communication block 51 to perform ID verification (in the present example, verification of electronic key ID through smart verification). The smart verification that is implemented through smart communication performed between the key function portion 56 and the verification ECU 9 may be the same as smart verification that is implemented through smart communication performed between the electronic key 2 and the verification ECU 9. Thus, the key function portion 56 performs ID verification that is executed through the same process as the electronic key 2 to allow operation of the on-board devices 3 of the vehicle 1, shared by a number of people.

When the on-board devices 3 are remotely operated with the mobile terminal 33, the user authentication function portion 57 performs wireless communication with the mobile terminal 33. When the on-board devices 3 are operated with the mobile terminal 33, the user authentication function portion 57 obtains the code information Kd, which is generated in an external device (in the present example, server), via the mobile terminal 33. If authentication of the code information Kd is accomplished and the vehicle 1 is used in the reserved time, the user authentication function portion 57 validates the key function portion 56 to allow the key function portion 56 to operate the on-board devices 3.

The car sharing system 31 includes a position monitor 60 and an automatic transmitter 61. In a non-restrictive example, the position monitor 60 and the automatic transmitter 61 are implemented as functions of the terminal control unit 42 (mobile terminal 33) by one or more processors (not shown) that execute one or more programs (instructions) stored in a storage region such as the memory 45. The position monitor 60 monitors whether the mobile terminal 33 (i.e., user carrying the mobile terminal 33) has approached the vehicle 1. In a non-restrictive example, the position monitor 60 may, for example, measure the received signal strength indicator (RSSI) of a radio wave received from the car share device 34 and determine whether the mobile terminal 33 has approached the vehicle 1 based on the measured value. When the vehicle closeness is detected using the RSSI, if the RSSI is high, the position monitor 60 may determine that the mobile terminal 33 has approached the vehicle 1. Alternatively, in another vehicle closeness detecting process, an acceleration sensor included in the mobile terminal 33 may be used. For example, when movement of the mobile terminal 33 is detected based on an output of the acceleration sensor, the position monitor 60 determines that the user carrying the mobile terminal 33 is moving toward the vehicle 1. Then, when the detection of movement of the mobile terminal 33 has been stopped, the position monitor 60 may assume that the user carrying the mobile terminal 33 is standing in front of the vehicle door 14 or is seated in a vehicle seat and determine that the mobile terminal 33 has approached the vehicle 1.

When the position monitor 60 determines that the mobile terminal 33 has approached the vehicle 1, the automatic transmitter 61 automatically transmits an actuation permission request that requests a permission for actuation of the on-board devices 3 from the mobile terminal 33. In a non-restrictive example, after the mobile terminal 33 transmits an unlocking request of the vehicle door 14, when the position monitor 60 determines that the mobile terminal 33 has approached the vehicle 1, the automatic transmitter 61 automatically transmits the actuation permission request of the on-board devices 3 from the mobile terminal 33.

The operation and effects of the car sharing system 31 will now be described with reference to FIGS. 2 to 5.

Figure 2:
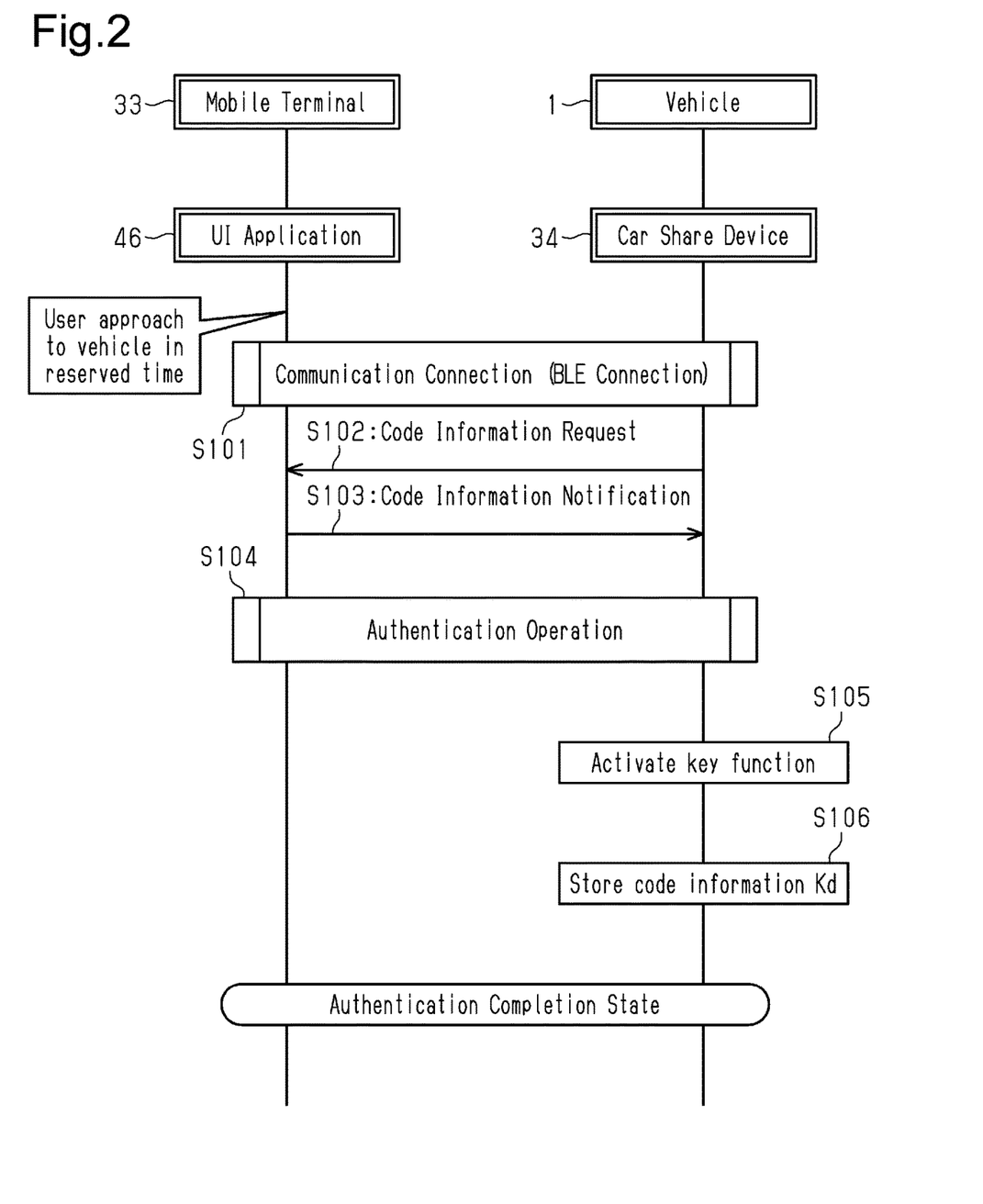
FIG. 2 is a sequence chart of user authentication.

FIG. 2 shows a sequence of code information authentication (user authentication). The electronic key ID and the electronic key-unique encryption code are registered to each of the memory 13 of the verification ECU 9 and the memory 53 of the car share device 34 in advance. The code information Kd (one-time key) obtained from the server is registered to the memory 45 of the mobile terminal 33 in advance.

In step S101, near-field communication is established between the mobile terminal 33 and the car share device 34. In a non-restrictive example, the share processing portion 47 and the user authentication function portion 57 execute communication connection to establish Bluetooth low energy (BLE) communication. At this time, when receiving an advertising packet that is periodically transmitted from the car share device 34, the mobile terminal 33 transmits a communication connection request to the car share device 34. Then, when the car share device 34 transmits a communication connection confirmation to the mobile terminal 33, BLE communication is established between the mobile terminal 33 and the car share device 34.

In step S102, when the communication connection (BLE connection) is completed, the user authentication function portion 57 transmits a code information request that requests notification of the code information Kd, which is registered to the mobile terminal 33. The code information request may be defined as a request for starting to use the shared vehicle 1.

In step S103, in response to the code information request, the share processing portion 47 transmits the code information Kd to the car share device 34 (code information notification). At this time, the code information Kd is encrypted with a predetermined encryption code (e.g., car share device-unique encryption code) registered to the car sharing system 31 and is transmitted to the car share device 34.

In step S104, the share processing portion 47 and the user authentication function portion 57 perform an authentication operation of the code information Kd. In the present example, the authentication operation (code information authentication) executes a process for decoding the code information Kd and a process for determining whether various parameters included in the code information Kd are correct. If the authentication operation (code information authentication) is accomplished, the process proceeds to step S105. If the authentication operation fails, the BLE communication is disconnected.

In step S105, after the authentication operation is accomplished, the user authentication function portion 57 switches the key function portion 56 from the deactivation state (invalid state) to the activation state (valid state). As a result, the car share device 34 enters a state configured to perform LF-UHF bidirectional communication with the verification ECU 9.

In step S106, the user authentication function portion 57 stores the code information Kd in the memory 53 of the car share device 34 and enters an authentication completion state. In the authentication completion state, the car share device 34 sets a reservation flag (not shown) held in the memory 53 to a value indicating the vehicle is in use. As a result, the car share device 34 is allowed to perform operations such as the locking and unlocking of the vehicle door 14 and the starting of the engine 6.

Figure 3:
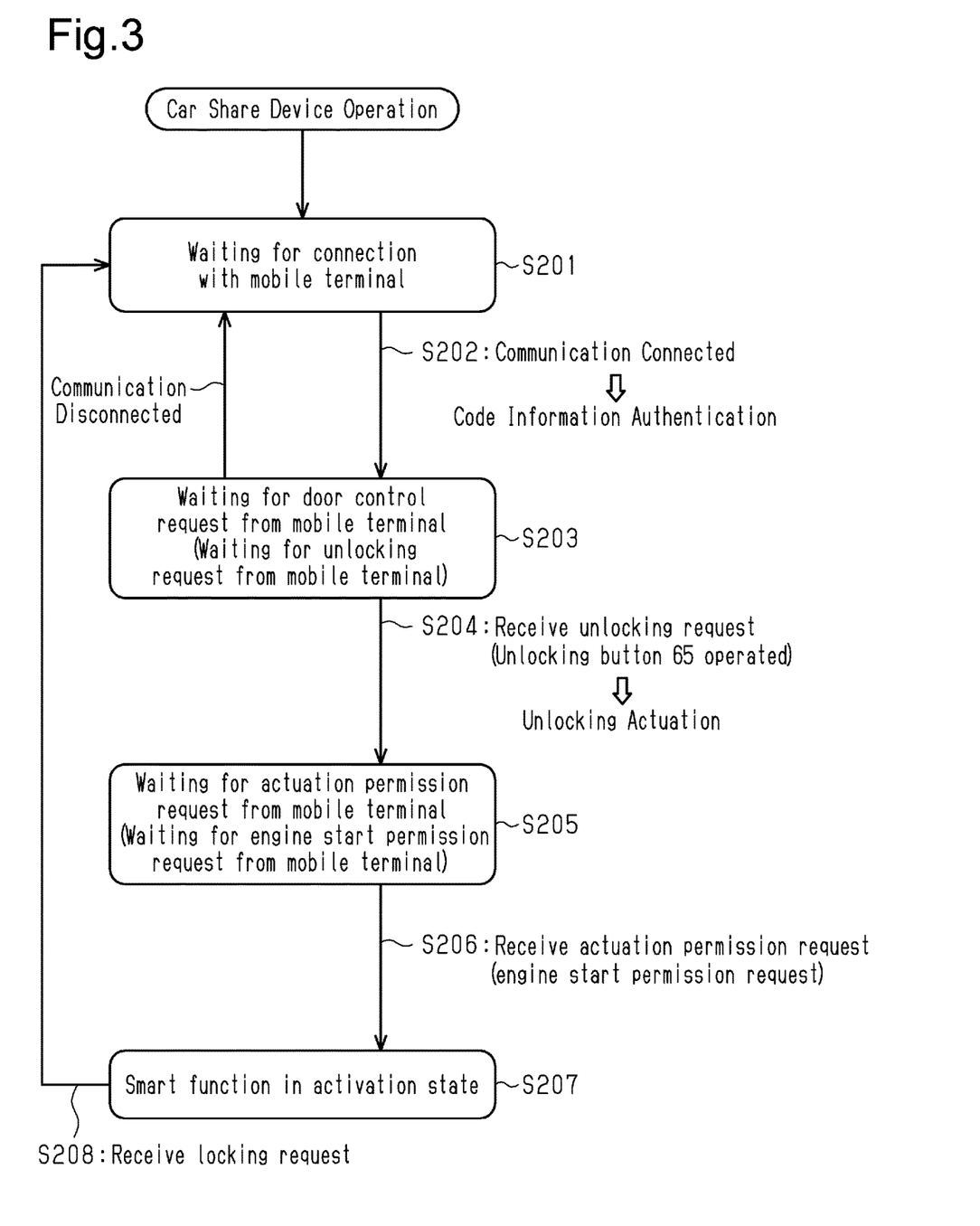
FIG. 3 is a flowchart showing operations of a car share device.
Figure 4:
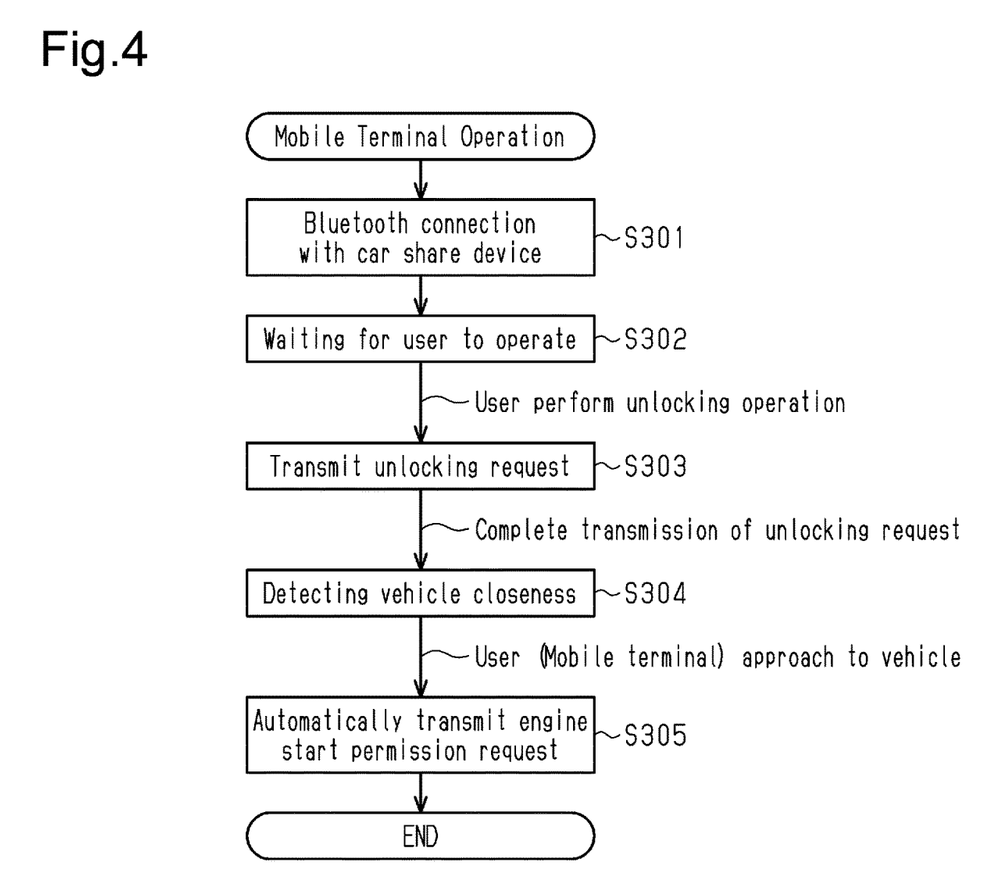
FIG. 4 is a flowchart showing operations of a mobile terminal.

FIG. 3 shows operation of the car share device 34 when the shared vehicle 1 is used. FIG. 4 shows operation of the mobile terminal 33 when the shared vehicle 1 is used.

In step S201, before the vehicle 1 is used, the user authentication function portion 57 is in a state waiting for connection with the mobile terminal 33 (waiting for communication connection). In the present example, the car share device 34 periodically transmits the advertising packet to monitor whether the mobile terminal 33 is present around the vehicle 1.

In step S202, the user authentication function portion 57 establishes communication connection with the mobile terminal 33. When the communication is established between the mobile terminal 33 and the car share device 34, the mobile terminal 33 and the car share device 34 execute the same process as the above-described code information authentication process (FIG. 2). When the code information authentication is accomplished, the mobile terminal 33 and the car share device 34 enter the authentication completion state.

In step S203, the key function portion 56 waits for a door control request to be transmitted from the mobile terminal 33 (door control request waiting state). The door control request is an unlocking request or a locking request that is transmitted from the mobile terminal 33. For example, when the vehicle 1 is in a parked state (doors are locked and engine is stopped), the key function portion 56 waits for the mobile terminal 33 to transmit the unlocking request. When the key function portion 56 enters the door control request waiting state (step S203), the smart function of the key function portion 56 is still maintained to be in the deactivation state (invalid state). When the BLE communication is disconnected in the door control request waiting state, the process returns to step S201.

In step S301 shown in FIG. 4, when the mobile terminal 33 receives the advertising packet from the car share device 34, the share processing portion 47 determines that the mobile terminal 33 is connected to the car share device 34 through Bluetooth. The process proceeds to step S302.

In step S302, the share processing portion 47 waits for the user to operate the mobile terminal 33. In the present example, a user operation waiting state refers to a state waiting for the on-board devices 3 to be remotely operated with the mobile terminal 33 through Bluetooth communication.

In step S303, when the share processing portion 47 detects an unlocking operation performed by the user on the mobile terminal 33, the share processing portion 47 transmits the unlocking request, which requests to unlock the vehicle door 14, to the car share device 34.

Referring back to FIG. 3, in step S204, when the unlocking request is received from the mobile terminal 33 in the door control request waiting state (state waiting for the unlocking request), the key function portion 56 starts unlocking actuation of the vehicle door 14. For example, when an unlocking button 65 shown on the screen of the mobile terminal 33 is operated, the unlocking request is transmitted from the mobile terminal 33 to the car share device 34. The unlocking request is encrypted with a predetermined encryption code registered to the car sharing system 31 and is transmitted.

When the unlocking request is received from the mobile terminal 33 as the door control request, the key function portion 56 transmits the unlocking request including the electronic key ID from the smart communication block 51 to the verification ECU 9 on a UHF radio wave through the communication network of the car share device 34 (UHF communication).

The verification ECU 9 transmits the unlocking request, received from the car share device 34, to the body ECU 10 through the communication line 12. When the unlocking request is received from the verification ECU 9, the body ECU 10 controls the door lock device 5 to switch the vehicle door 14 from the locked state to the unlocked state. As a result, the vehicle door 14 is unlocked, and entrance into the vehicle is allowed.

In response to reception of the unlocking request from the mobile terminal 33, the user authentication function portion 57 counts up the unlocking requests in a log. After counting up the unlocking requests in the log, the user authentication function portion 57 transmits an unlocking transmission notification to the mobile terminal 33 as a door control notification. The unlocking transmission notification indicates that the car share device 34 has transmitted the unlocking request to the verification ECU 9 of the electronic key system 4. For example, the unlocking transmission notification is encrypted with a predetermined encryption code registered to the car sharing system 31 and is transmitted to the mobile terminal 33. When the unlocking transmission notification is received from the car share device 34, the share processing portion 47 shows on the screen of the mobile terminal 33 that transmission of the unlocking request is completed.

In step S205, the car share device 34 waits for the mobile terminal 33 to transmit the actuation permission request (actuation permission request waiting state). In the present example, the car share device 34 waits for the mobile terminal 33 to transmit an engine start permission request. The engine start permission request is transmitted from the mobile terminal 33 when an engine start permission operation is performed on the mobile terminal 33. When the car share device 34 enters an engine start permission request waiting state (step S205), the smart function of the key function portion 56 is still maintained to be in the deactivation state (invalid state).

In step S304 shown in FIG. 4, after the mobile terminal 33 transmits the unlocking request (step S303), the position monitor 60 monitors whether the mobile terminal 33 has approached the vehicle 1 (vehicle closeness monitoring state). For example, when the RSSI is used, the position monitor 60 measures the RSSI of a radio wave periodically received by the mobile terminal 33 from the car share device 34 through Bluetooth communication. When the RSSI is greater than or equal to a threshold value, it is determined that the mobile terminal 33 has approached the vehicle 1. Alternatively, when an acceleration sensor is used, if it is determined that the mobile terminal 33 is not moved based on an output of the acceleration sensor, the position monitor 60 assumes that the user is standing in front of the vehicle 1 or is seated in a vehicle seat and determines that the mobile terminal 33 has approached the vehicle 1.

In step S305, when it is determined that the user (mobile terminal 33) has approached the vehicle 1, the automatic transmitter 61 automatically transmits the actuation permission request (in the present example, engine start permission request), which requests a permission for actuation of the on-board devices 3, from the mobile terminal 33 to the car share device 34 through Bluetooth communication. With this configuration, the actuation permission request is transmitted from the mobile terminal 33 without a particular operation that would be performed by the user on the mobile terminal 33.

Referring back to FIG. 3, in step S206, when the engine start permission request is received from the mobile terminal 33, the car share device 34 determines that the condition for switching the smart function of the key function portion 56 to the activation state (valid state) is satisfied. As described above, when the vehicle door 14 is in the unlocked state and the car share device 34 receives the engine start permission request from the mobile terminal 33, the smart function of the key function portion 56 is permitted to be validated.

In step S207, the car share device 34 switches the smart function of the key function portion 56 from the deactivation state (invalid state) to the activation state (valid state). As a result, the car share device 34 is allowed to perform ID verification (smart verification) through smart communication performed with the verification ECU 9 of the electronic key system 4.

Figure 5:
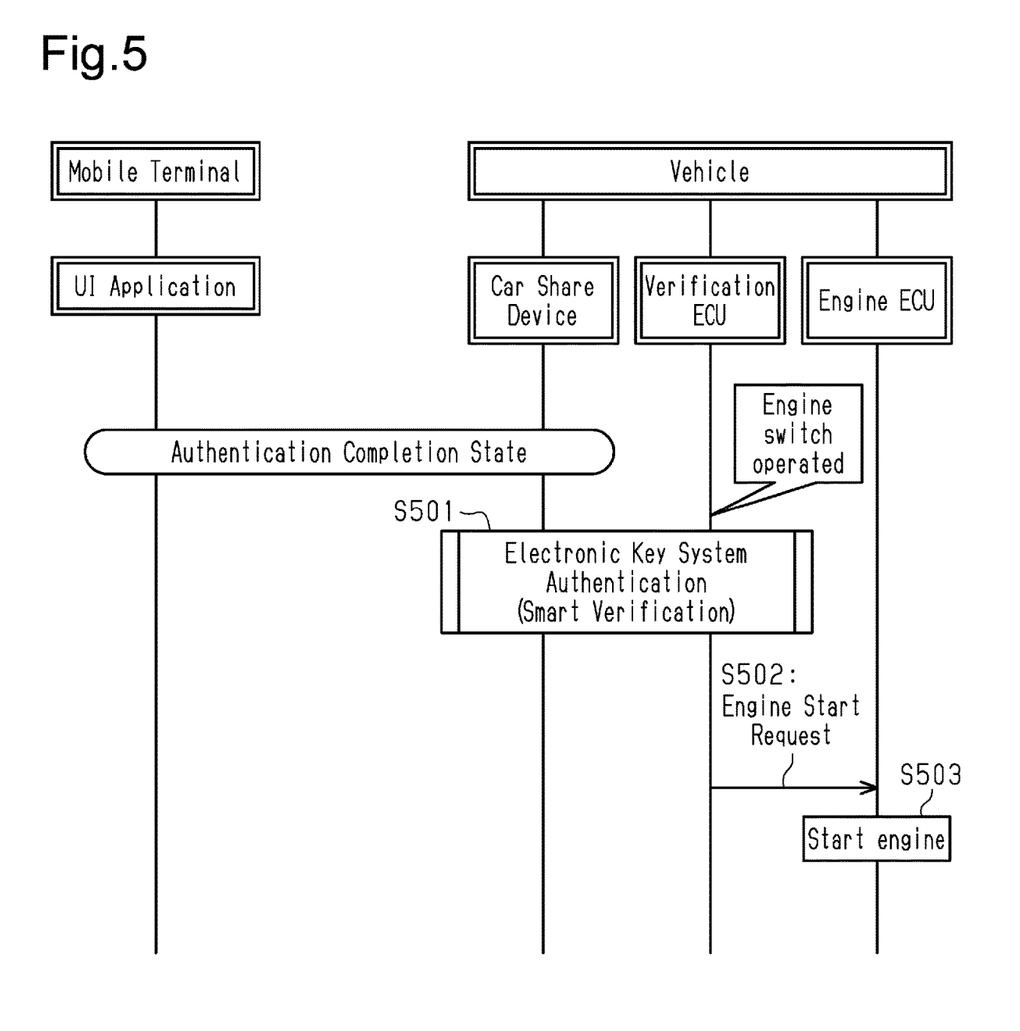
FIG. 5 is a sequence chart when starting the engine of the vehicle.

FIG. 5 shows a sequence of starting the engine 6 of the vehicle 1 through smart verification. When starting the engine 6, for example, the user pushes the engine switch 28, located near the driver seat, while performing a braking operation.

When the car share device 34 and the mobile terminal 33 (user interface application 46) are in the authentication completion state and the smart function of the key function portion 56 is validated (refer to FIG. 3), the verification ECU 9 is allowed to perform ID verification (smart verification) through smart communication performed with the car share device 34. The smart verification of the car share device 34 is performed in the same manner as the smart verification of the electronic key 2 in the electronic key system 4.

In step S501, when it is determined that the engine switch 28 is operated with the braking operation, the verification ECU 9 uses the smart function of the key function portion 56 to perform smart verification of the car share device 34.

At this time, the verification ECU 9 transmits a wake signal from the indoor transmitter 17 on an LF radio wave. In response to the wake signal, the car share device 34 replies with an acknowledge signal. When the acknowledge signal is received from the car share device 34, the verification ECU 9 starts smart verification of the car share device 34. In this smart verification, in the same manner as the smart verification of the electronic key 2, the verification ECU 9 performs verification of the electronic key ID registered to the memory 53 and challenge-response authentication that uses the electronic key-unique encryption code registered to the memory 53. When it is determined that the smart verification is accomplished, the verification ECU 9 permits the stating of the engine 6.

In step S502, the verification ECU 9 transmits an engine start request to the engine ECU 11 through the communication line 12.

In step S503, in response to the engine start request from the verification ECU 9, the engine ECU 11 starts the engine 6.

Subsequently, when the engine 6 is started and the engine switch 28 is pushed, the engine 6 stops. After the engine 6 stops, the body ECU 10 determines whether the user has disembarked from the vehicle based on the door courtesy switch 27. When the body ECU 10 determines that the user disembarked from the vehicle, the car share device 34 waits for the mobile terminal 33 to transmit the locking request (door control request) (door control request waiting state). More specifically, the car share device 34 monitors whether the user uses the mobile terminal 33 to perform a locking operation of the vehicle door 14.

Referring back to FIG. 3, in step S208, when the vehicle door 14 is in the unlocked state and the locking request is received from the mobile terminal 33, the car share device 34 locks the vehicle door 14. The locking actuation is the same process as the unlocking actuation and thus will not be described in detail. When the vehicle door 14 is locked, the car share device 34 returns to the state waiting for connection with the mobile terminal 33 (step S201). As a result, the smart function of the key function portion 56 is switched back to the deactivation state from the activation state.

The car sharing system 31, which has been described above, has the advantages described below.

When operating the on-board devices 3 of the vehicle 1 with the mobile terminal 33 in the car sharing system 31, unless the mobile terminal 33 sufficiently approaches the vehicle 1 and the actuation permission request is transmitted from the mobile terminal 33 to the vehicle 1, the on-board devices 3 cannot be actuated. Thus, the condition for operating the on-board devices 3 with the mobile terminal 33 is that the user carrying the mobile terminal 33 is sufficiently close to the vehicle 1. This improves the security of the vehicle 1 when used. In addition, the actuation permission request is automatically transmitted from the mobile terminal 33 to the vehicle 1. The user does not have to perform an additional operation for transmitting the actuation permission request. This improves the convenience for the user.

The car share device 34 is not connected to the electronic key system 4 by wire and is connected to the electronic key system 4 through wireless communication. This allows the car share device 34 to be readily retro-fitted to the vehicle 1.

After the mobile terminal 33 transmits the unlocking request of the vehicle door 14, if the position monitor 60 determines that the mobile terminal 33 has approached the vehicle 1, the automatic transmitter 61 automatically transmits the actuation permission request from the mobile terminal 33. Thus, after the vehicle door 14 is switched to the unlocked state, the series of processes that monitor whether the mobile terminal 33 has approached the vehicle 1 and automatically transmit the actuation permission request is executed. Hence, the actuation permission request is transmitted when the user intends to enter the vehicle. The automatic transmission of the actuation permission request is accurately aligned with the intention of the user.

The mobile terminal 33 includes the position monitor 60 and the automatic transmitter 61. The monitoring of the vehicle closeness and the automatic transmission of the actuation permission request are performed at the mobile terminal 33. Thus, the car share device 34 does not have to have these kinds of functions.

When the unlocking request of the vehicle door 14 is received from the mobile terminal 33, the car share device 34 enters the actuation permission request waiting state, in which the car share device 34 waits for reception of the actuation permission request of the on-board devices 3. When the actuation permission request is received from the mobile terminal 33 in the actuation permission request waiting state, the smart function of the key function portion 56 is switched from the deactivation state to the activation state. Thus, when operating the on-board devices 3 of the vehicle 1 with the mobile terminal 33 in the car sharing system 31, unless the actuation permission request is transmitted from the mobile terminal 33 to the car share device 34 and the smart function of the key function portion 56 is validated, the ID verification through smart communication cannot be executed and the on-board devices 3 cannot be actuated. Thus, when operating the on-board devices 3 with the mobile terminal 33, the condition for validating the smart function needs to be satisfied. This is further advantageous to improvement of the security of the shared vehicle 1 when used, as compared to when the smart function is validated with no condition.

The actuation permission request is the engine start permission request, which requests to start the engine 6 of the vehicle 1. When starting the engine 6 of the vehicle 1, the engine start permission request needs to be transmitted from the mobile terminal 33 to the vehicle 1. This reduces situations in which the engine 6 is fraudulently started.

The present embodiment is not limited to the configurations described above and may be modified as follows.

The actuation permission request that is automatically transmitted is not limited to the engine start permission request. For example, the actuation permission request may be an engine start execution request. In this case, at the point in time when the vehicle 1 receives the engine start execution request from the mobile terminal 33, the vehicle 1 starts the engine 6. As described above, the actuation permission request may be changed to various requests.

The timing of transmitting the actuation permission request is not limited to the timing subsequent to transmission of the unlocking request of the vehicle door 14 and may be changed to another timing.

The vehicle closeness detection process is not limited to the process that uses the RSSI or the acceleration sensor and may be changed to another process such as a process that makes a determination based on, for example, an image captured by a camera.

The series of processes that monitor the vehicle closeness and automatically transmit the actuation permission request may be executed whenever the vehicle 1 is used (the user enters the vehicle 1) or may be executed when the sharing is started.

The validation period of the smart function may have a limited time.

The provision of the position monitor 60 is not limited to the mobile terminal 33. The position monitor 60 may be provided, for example, on the car share device 34. More specifically, the monitoring of the vehicle closeness may be performed at the car share device 34 instead of the mobile terminal 33.

The code information Kd is not limited to that encrypted with the car share device-unique encryption code. The code information Kd may be encrypted with another encryption code.

The contents of the code information Kd may be changed to configurations other than those described in the embodiment.

The authentication operation (authentication using code information Kd) shown in S104 is not limited to the example described in the embodiment and may be changed to another configuration.

The code information Kd is not limited to that generated in the server and may be generated in another external device.

In the electronic key system 4 (smart verification system), the process for determining the position of the electronic key 2 is not limited to that using the outdoor transmitter 16 and the indoor transmitter 17. For example, LF antennas may be arranged at the left and right sides of the vehicle body. Whether the electronic key is located inside or outside the vehicle may be determined based on a response of the electronic key 2 when receiving radio waves from each of the LF antennas.

The electronic key system 4 may be a wireless key system that performs ID verification that is, for example, initiated by communication from the electronic key 2.

The electronic key 2 is not limited to a SmartKey (registered trademark)-type and may be a wireless key.

The near-field communication is not limited to Bluetooth communication and may be changed to another communication method.

The communication method and frequency used in each communication are not limited to those described in the embodiment and may be changed to other configurations.

The ID verification performed in the electronic key system 4 is not limited to the verification including challenge-response authentication. Any authentication and verification may be included as long as at least the electronic key ID verification is performed.

The code information Kd is not limited to a one-time key and may be any configuration that limits the use of the code information Kd.

The encryption code used in the encryption communication may be, for example, any one of the car share device-unique encryption code, the user authentication code, and the electronic key-unique encryption code. For example, when the encryption codes are switched and used during a process, it is advantageous to improvement of the security of communication. The encryption codes that are used are not limited to the above-described codes and may be changed to various codes.

The location where the car share device 34 is installed is not particularly limited.

The mobile terminal 33 is not limited to a high-performance mobile phone and may be changed to various terminals.

Although not particularly described in the embodiment, it is preferred that encryption communication used when performing ID verification between the key function portion 56 (car share device 34) and the verification ECU 9 of the electronic key system 4 is functionally separate from encryption communication performed between the user authentication function portion 57 (car share device 34) and the mobile terminal 33 when the on-board devices 3 are operated with the mobile terminal 33. With this configuration, even if the encryption code that is used in one of the two encryption communications is stolen, the encryption code cannot be used in the other encryption communication. This improves the security of the vehicle when used.

The invention claimed is:

1. A car sharing system, comprising:
    a car share device mounted on a vehicle, wherein the car share device performs wireless communication with a mobile terminal, to which code information is registered so that the mobile terminal is actuated as a vehicle key of the vehicle, to authenticate the code information through the wireless communication, and in an authentication completion state of the code information, the car share device performs ID verification through an electronic key system of the vehicle to allow the mobile terminal to operate an on-board device;
    a position monitor that monitors whether the mobile terminal has approached the vehicle; and
    an automatic transmitter that automatically transmits an actuation permission request, which requests a permission for actuation of the on-board device, from the mobile terminal when the position monitor determines that the mobile terminal has approached the vehicle, wherein
    the car share device includes a key function portion that implements a smart function to perform the ID verification through bidirectional short-range wireless communication with the electronic key system,
    when an unlocking request of a vehicle door of the vehicle is received from the mobile terminal, the car share device enters an actuation permission request waiting state, in which the car share device waits for reception of the actuation permission request, and
    when the actuation permission request is received from the mobile terminal in the actuation permission request waiting state, the car share device switches the smart function of the key function portion from a deactivation state to an activation state.

2. The car sharing system according to claim 1, wherein the car share device is not connected to the electronic key system by wire and is connected to the electronic key system through wireless communication.

3. The car sharing system according to claim 1, wherein after the mobile terminal transmits the unlocking request of the vehicle door of the vehicle, when the position monitor determines that the mobile terminal has approached the vehicle, the automatic transmitter automatically transmits the actuation permission request from the mobile terminal.

4. The car sharing system according to claim 1, wherein the mobile terminal includes the position monitor and the automatic transmitter.

5. The car sharing system according to claim 1, wherein the actuation permission request is an engine start permission request that requests to start an engine of the vehicle.

6. A car sharing method, the method comprising:
    registering code information to a mobile terminal to allow the mobile terminal to be actuated as a vehicle key of a vehicle;
    authenticating the code information through wireless communication between the mobile terminal and a car share device of the vehicle;
    in an authentication completion state of the code information, transmitting an unlocking request of a vehicle door of the vehicle from the mobile terminal to the car share device to have the car share device enter an actuation permission request waiting state in response to the unlocking request;
    monitoring, at the mobile terminal, whether the mobile terminal has approached the vehicles;
    automatically transmitting an actuation permission request, which requests a permission for actuation of an on-board device, from the mobile terminal when it is determined that the mobile terminal has approached the vehicle;
    switching a smart function of the car share device from a deactivation state to an activation state when the car share device receives the actuation permission request in the actuation permission request waiting state; and
    in the activation state of the smart function, performing ID verification through bidirectional short-range wireless communication with an electronic key system of the vehicle to allow the mobile terminal to operate the on-board device.

* * * * *